S. F. WHITMAN.
MACHINE FOR CASTING CONFECTIONERY.

No. 169,935.   Patented Nov. 16, 1875.

WITNESSES:    INVENTOR

UNITED STATES PATENT OFFICE.

STEPHEN F. WHITMAN, OF PHILADELPHIA, PENNSYLVANIA.

IMPROVEMENT IN MACHINES FOR CASTING CONFECTIONERY.

Specification forming part of Letters Patent No. 169,935, dated November 16, 1875; application filed October 12, 1875.

*To all whom it may concern:*

Be it known that I, STEPHEN F. WHITMAN, of the city and county of Philadelphia and State of Pennsylvania, have invented a certain new and useful Machine for Casting Confectionery; and I do hereby declare the following to be a sufficiently full, clear, and exact description thereof to enable any person skilled in the art to make and use the said invention, reference being had to the accompanying drawing, forming a part of this specification, and the letters of reference marked thereon.

Figure 1:
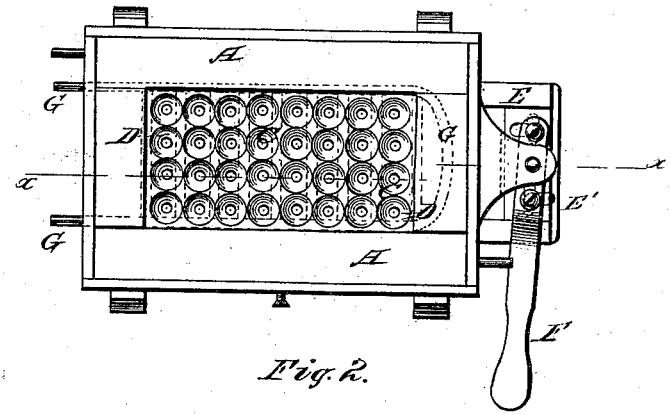
Figure 2:
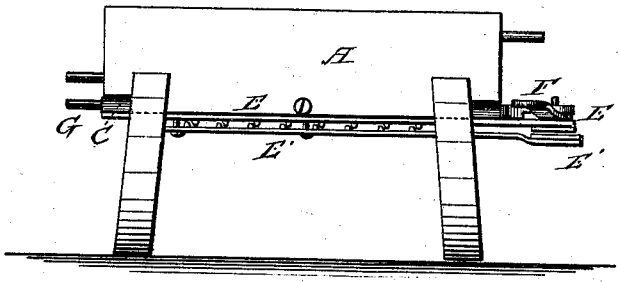
Figure 3:
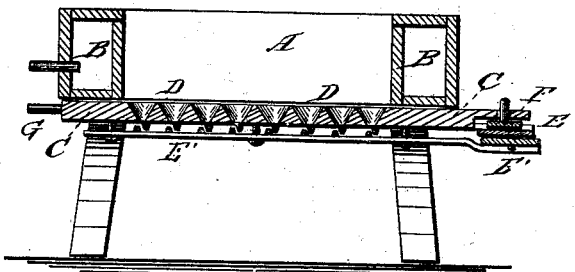
Figure 4:
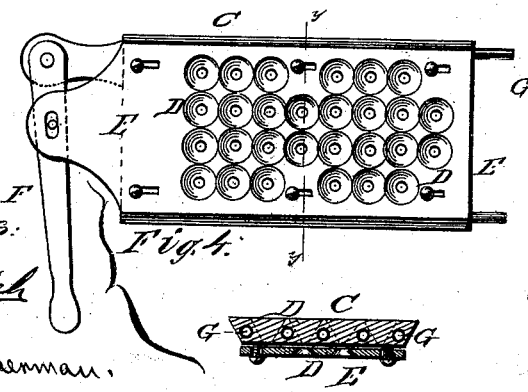

Figure 1 shows a plan, Fig. 2 shows a side elevation, and Fig. 3 a vertical section, of this invention made in one form; and Fig. 4 shows, in vertical section, a modified form of this invention.

The same letters of reference apply to the same parts in the several figures.

The nature of my invention consists in attaching to a box formed with double walls, adapted to heating its contents by the circulation of steam or other heating-fluid in its walls, a bottom perforated so as to deliver a stream of material into each mold, and underneath each aperture is placed a sliding gate or gates by which the several streams of material can be simultaneously cut off.

The bottom of the tank is detachable, to permit of the introduction of others adapted to the various sizes and shapes of the molds.

A represents a tank or box having a steam-space, B, around its walls. C is a bottom perforated with funnel-shaped apertures D, and E and E' are sliding gates operated by a lever, F, so as to simultaneously close all of the apertures. In the form shown in Fig. 4 but one sliding gate, E, is used.

The perforated bottom may be made with a space, G, (shown in dotted lines in Fig. 1,) so as to permit of a circulation of steam or other heating-fluid through it.

When used the molds are placed under the tank, so that each mold is under one of the funnel-shaped apertures. The sliding gate is now opened, and as soon as the molds are filled the gates E are simultaneously closed by the lever F.

I am aware that attempts have been made to cast confections in multiple-molds by pouring them in a heated state from vessels having sliding gates at the upper sides of the discharging-aperture. This, therefore, I distinctly disclaim.

What I do claim as my invention, and desire to secure as such by Letters Patent, is—

1. The double-walled heated vessel A, combined with the perforated bottom C, provided with a sliding gate or gates at the lower side, as and for the purposes set forth.

2. The double-walled vessel A, provided with detachable perforated bottoms having sliding gates on the lower side, as and for the purpose set forth.

3. The double-walled perforated bottom C, combined with the tank A and gates E, as and for the purpose set forth and shown.

STEPHEN F. WHITMAN.

Witnesses:
 A. MIALL,
 JOHN URIAN.